Patented July 13, 1954

2,683,728

UNITED STATES PATENT OFFICE 2,683,728

MONOADDUCTS OF POLYISOCYANATES AND TERTIARY ALCOHOLS

Thomas G. Mastin, Akron, and Nelson V. Seeger, Cuyahoga Falls, Ohio, assignors, by mesne assignments, to The Goodyear Tire & Rubber Company, a corporation of Ohio No Drawing. Application November 1, 1950, Serial No. 193,512

10 Claims. (Cl. 260—453)

This invention relates to new compositions of matter and to a method for preparing the same. More particularly, it relates to mono(tertiary carbinol urethane) substituted organic isocyanates and to methods for their preparation.

The reactivity of the isocyanate radical with compounds containing labile hydrogen is known. In certain chemical reactions where polyisocyanates are employed, the marked reactivity of the compounds results in certain difficulties. For example, this is true where a polyisocyanate is used to cure or cross-link diisocyanate-modified polyesters or polyesteramides such as those described in our co-pending applications Serial No. 170,055 and Serial No. 170,056, now abandoned. According to the present invention, a means is provided for controlling the reactivity of polyisocyanates.

The broad object of this invention is to provide a new class of chemical compounds from polyisocyanates and tertiary alcohols. It is a particular object to provide a new class of chemical compounds some of which are useful as delayed-action curing or cross-linking agents for diisocyanate-modified polyesters and polyesteramides. It is another object of this invention to provide as new compositions of matter the monoadducts of polyisocyanates and tertiary alcohols. A specific object is to prepare the mono-adducts of polyisocyanates and tertiary alcohols in which the reactivity of the isocyanate radicals may be controlled.

A convenient method for the preparation of the new compounds to which this invention relates may be represented by the following equation:

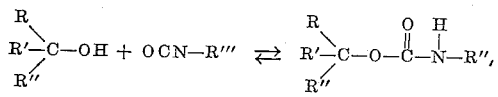

in which R, R' and R'' are organic radicals and R''' is an organic radical which contains at least one —NCO group.

It will be noted that the reaction between the polyisocyanate and tertiary alcohol is a reversible reaction, the direction of which may be controlled by temperature. The mono-adduct of the polyisocyanate and the tertiary alcohol is formed at relatively low temperatures while the formed mono-adduct dissociates into the polyisocyanate and the alcohol at relatively high temperatures in the range of from 100° C. to 150° C. It is this temperature control over the direction of the reaction which makes some mono-adducts particularly useful in controlled chemical reactions, such as their use as cross-linking agents for diisocyanate-modified polyesters and polyesteramides. In the latter case, the mono-adduct does not dissociate into the reactive polyisocyanate until the curing temperatures are reached. Therefore, at normal processing temperatures, the mono-adduct remains stable and minimizes the cross-linking of the linear extended polymer. The mono-adducts are also useful as a means for controlling the tendency of polyisocyanates to self-polymerize since the inactivation of one active —NCO group in the polyisocyanate will retard such polymerization.

In the preparation of the mono-adducts, any polyisocyanate may be used. Representative examples are the aliphatic compounds such as ethylene, trimethylene, tetramethylene, pentamethylene, hexamethylene, propylene-1,2, butylene-1,2, butylene-2,3, butylene-1,3, ethylidene and butylidene diisocyanates; the cycloalkylene compounds such as cyclopentylene-1,3, cyclohexylene-1,4, and cyclohexylene-1,2 diisocyanates; the aromatic compounds such as m-phenylene p-phenylene, 4,4'-diphenyl, 1,5-naphthalene, and 1,4-naphthalene diisocyanates; the aliphatic-aromatic compounds such as 4,4'-diphenylene methane, 2,4-tolylene, 4,4'-tolidine, and 1,4-xylylene diisocyanates; the nuclear substituted aromatic compounds such as dianisidine diisocyanate, 4,4'-diphenyl ether diisocyanate and chloro-diphenylene diisocyanate; the triisocyanates such as 4,4',4''-triisocyanto triphenyl methane, 1,3,5-triisocyanto benzene, and 2,4,6-triisocyanto toluene; and the tetraisocyanates such as 4,4'-dimethyl-diphenyl methane 2,2',5,5'-tetraisocyanate.

Any tertiary alcohol may be used in the formation of the mono-adducts. Representative examples are tertiary butyl alcohol, tertiary amyl alcohol, dimethyl ethinyl carbinol, dimethyl phenyl carbinol, methyl diphenyl carbinol, triphenyl carbinol, 1-nitro tertiary butyl carbinol, 1-chloro tertiary butyl carbinol, and triphenyl silinol.

Certain preferred mono-adducts are those resulting from the reaction of a tertiary alcohol and any one of the following:

1. 4,4'-diphenyl diisocyanate
2. 2,4-tolylene diisocyanate
3. 1,5-naphthalene diisocyanate
4. hexamethylene diisocyanate Specific mono-adducts which are preferred are those resulting from the reaction of:

1. tertiary butyl alcohol and 4,4'-diphenyl diisocyanate 2. tertiary butyl alcohol and 2,4-tolylene diisocyanate
3. tertiary butyl alcohol and 1,5-naphthalene diisocyanate
4. tertiary butyl alcohol and hexamethylene diisocyanate
5. tertiary amyl alcohol and 4,4'-diphenyl diisocyanate
6. tertiary amyl alcohol and 2,4-tolylene diisocyanate
7. tertiary amyl alcohol and 1,5-naphthalene diisocyanate
8. tertiary amyl alcohol and hexamethylene diisocyanate
9. dimethyl ethinyl carbinol and 4,4'-diphenyl diisocyanate
10. dimethyl ethinyl carbinol and 2,4-tolylene diisocyanate
11. dimethyl ethinyl carbinol and 1,5-naphthalene diisocyanate
12. dimethyl ethinyl carbinol and hexamethylene diisocyanate In the preparation of the mono-adducts in general, the polyisocyanate and the tertiary alcohol are usually dissolved in a suitable inert solvent such as toluene, methyl ethyl ketone, or o-dichlorobenzene. The solutions are stirred together and permitted to stand. The mono-adduct formed separates from the solution and is removed therefrom by filtering or evaporation of the solvent. The time required for the mono-adduct to form will vary from a few minutes to several hours depending upon the particular reactants used. Usually an excess of the polyisocyanate is provided so that the product which separates will be substantially pure mono-adduct. The material removed from solution will probably contain small amounts of the di-adduct and the unreacted material which, if necessary, can be removed by recrystallization procedures known to those skilled in the art.

The preparation of mono(tertiary carbinol urethane) substituted organic isocyanates is illustrated by the following example which is to be interpreted as representative rather than restrictive of the scope of this invention.

Example 4,4'-diphenyl diisocyanate (0.15 mol) and tertiary amyl alcohol (0.10 mol) were dissolved in 400 cubic centimeters of dry toluene. The solution was refluxed for 5 hours. The mono-adduct began to separate from solution during the first hour. The solution was cooled, and the mono-adduct removed by filtration. After resuspension in petroleum ether and filtration of the solution, the mono-adduct was air dried at room temperature. A yield of 27% was obtained.

While certain representative embodiments and details have been shown for the purpose of illustrating the invention, it will be apparent to those skilled in this art that various changes and modifications may be made therein without departing from the spirit or scope of the invention.

We claim:

1. As new compositions of matter, the mono(tertiary carbinol urethane) substituted organic isocyanates said isocyanates being selected from the group consisting of aliphatic, cycloalkylene, aromatic and nuclear-substituted aromatic isocyanates.

2. As new compositions of matter, the mono-adducts of a tertiary alcohol and a polyisocyanate selected from the group consisting of aliphatic, cycloalkylene, aromatic and nuclear-substituted aromatic polyisocyanates.

3. As new compositions of matter, the mono-adducts of a tertiary alcohol and 4,4'-diphenyl diisocyanate.

4. As new compositions of matter, the mono-adducts of a tertiary alcohol and 2,4-tolylene diisocyanate.

5. As new compositions of matter, the mono-adducts of a tertiary alcohol and 1,5-naphthalene diisocyanate.

6. As new compositions of matter, the mono-adducts of a tertiary alcohol and hexamethylene diisocyanate.

7. As new compositions of matter, the mono-adducts of tertiary butyl alcohol and a polyisocyanate selected from the group consisting of aliphatic, cycloalkylene, aromatic and nuclear-substituted aromatic polyisocyanates.

8. As new compositions of matter, the mono-adducts of tertiary amyl alcohol and a polyisocyanate selected from the group consisting of aliphatic, cycloalkylene, aromatic and nuclear-substituted aromatic polyisocyanates.

9. As new compositions of matter, the mono-adducts of dimethyl ethinyl carbinol and a polyisocyanate selected from the group consisting of aliphatic, cycloalkylene, aromatic and nuclear-substituted aromatic polyisocyanates.

10. The method of making mono(tertiary carbinol urethane) substituted organic isocyanates which comprises reacting approximately equal molecular amounts of a tertiary alcohol and a polyisocyanate at a temperature below 100° C. said polyisocyanate being selected from the group consisting of aliphatic, cycloalkylene, aromatic and nuclear-substituted aromatic polyisocyanates.

References Cited in the file of this patent

UNITED STATES PATENTS

| Number | Name | Date |
|---|---|---|
| 2,320,704 | Petersen et al. | June 1, 1943 |

FOREIGN PATENTS

| Number | Country | Date |
|---|---|---|
| 898,089 | France | Apr. 10, 1945 |

OTHER REFERENCES

Whitmore, Organic Chemistry (1937), page 142.